United States Patent [19]
Adams

[11] Patent Number: 5,156,429
[45] Date of Patent: Oct. 20, 1992

[54] UTILITY HANDLE

[76] Inventor: Michael E. Adams, 2009 Walters Ave., Northbrook, Ill. 60062

[21] Appl. No.: 758,177

[22] Filed: Sep. 11, 1991

Related U.S. Application Data

[63] Continuation of Ser. No. 495,487, Mar. 19, 1990, abandoned.

[51] Int. Cl.[5] .............................................. B65G 7/12
[52] U.S. Cl. .................................. 294/25; 294/19.1; 16/114 R
[58] Field of Search ............... 294/25, 26, 19.1, 57, 294/58; 16/110 R, 113, 114 R; 43/21.2, 25; 224/219, 222, 267

[56] References Cited

U.S. PATENT DOCUMENTS

| | | | |
|---|---|---|---|
| 215,081 | 9/1969 | Zagwyn | D8/138 |
| 239,011 | 3/1976 | Hamasaka | D12/178 |
| 407,571 | 7/1889 | Calef | 294/26 X |
| 712,843 | 11/1902 | Paul | 294/58 |
| 929,173 | 7/1909 | Stone | 294/26 X |
| 2,482,589 | 9/1949 | Maguire | 294/58 |
| 2,504,880 | 4/1950 | Rittenhouse | 224/267 X |
| 2,546,113 | 3/1951 | Spang | 294/25 X |
| 2,654,874 | 7/1953 | Collins | 16/113 X |
| 2,989,334 | 6/1961 | Browne | 294/19.1 |
| 3,223,383 | 12/1965 | Hrabal | 294/57 X |
| 3,574,380 | 4/1971 | Tague | 294/26 X |
| 4,094,391 | 6/1978 | Ratchford | 190/18 A |
| 4,364,592 | 12/1982 | Jackson | 294/26 |
| 4,660,875 | 4/1987 | Ziegler | 294/26 |
| 4,691,954 | 9/1987 | Shaud | 294/57 X |
| 4,759,306 | 7/1988 | McKenzie | 114/39.2 |
| 4,865,373 | 9/1989 | Hudson | 294/57 X |

OTHER PUBLICATIONS

Representative pages (the cover page, pp. 4, 5, 37 and 66, and advertisement pages marked as numbers A-1, A-2, A-3 and A-4) from the May, 1990 issue of *Lost Treasure* magazine.

*Primary Examiner*—Margaret A. Focarino
*Assistant Examiner*—Dean J. Kramer
*Attorney, Agent, or Firm*—Olson & Hierl, Ltd.

[57] ABSTRACT

The present invention relates to a utility handle for lifting, lowering, supporting and maneuvering articles. The device comprises a generally S-shaped handle including a front portion that is engageable with the article and a handgrip member to be grasped by the hand of the user and further including a rear portion that is engageable with the forearm of the user. The utility handle substantially transfers the load of any attached article from the user's wrist to his forearm, and through the elbow joint, to the user's upper arm muscles to facilitate handling of the article.

11 Claims, 3 Drawing Sheets

UTILITY HANDLE

This application is a continuation of application Ser. No. 07/495,487, filed Mar. 19, 1990, now abandoned.

FIELD OF THE INVENTION

The present invention relates to a utility handle and in particular to a hand-held device for lifting, lowering, supporting and maneuvering articles.

BACKGROUND OF THE INVENTION

Numerous hand-held devices have been developed for moving and supporting heavy or bulky articles. Representative devices include log hooks, ice hooks and the like. For example, U.S. Pat. No. 4,364,592 to Jackson discloses a multi-purpose log handling tool including a handle with a slidably mounted hook.

U.S. Pat. No. 4,600,875 to Ziegler discloses a meat hook comprising a frame, a hook extending from the frame, a handle element attached to the frame and a leather strap for securing the frame to the hand of the user.

U.S. Pat. No. 4,094,391 to Ratchford relates to a transporting hook that engages the handles of one or more suitcases. The hook includes a metal rod that is bent at one end to form a handle and includes a perpendicular J-shaped hook at the other end for holding one or more suitcases.

While the foregoing devices are generally useful for lifting and supporting articles, the load of these articles is primarily exerted on the wrist of the user, just as with more commonly known types of handles such as those found on plastic milk containers, electric drills, coffee carafes, spray painting devices and the like. This can severely limit the ability of the average user to handle heavy or bulky loads. In some situations (for example, when the user has an arthritic or otherwise injured wrist), this can actually prevent the user from lifting the object at all.

A number of recent studies have found a direct correlation between the performance of certain repetitive tasks in the workplace and various types of injuries to the muscles and connective tissues of the human wrist. The most notable of these repetitive motion injuries is known as "carpal tunnel syndrome."

Accordingly, it would be beneficial to provide a handle which would prevent the user's wrist from moving in response to a loading situation and instead cause the load to be shifted or transferred to the forearm, elbow and muscles of the upper arm. Such a hand-held device would allow the user to handle heavy loads with previously unknown levels of comfort and ease of movement.

In addition, in those situations where an object needed to be supported for any length of time (such as with spray devices in an auto painting facility), such a device would reduce fatigue on the part of the user and, by doing so, also improve the accuracy of his work. Any device providing such a range of benefits would appear to have a great many potential applications both in consumer products and in the workplace.

SUMMARY OF THE INVENTION

The present invention relates to a utility handle comprising a generally S-shaped hand-held device for lifting, lowering, supporting and maneuvering articles. The device includes a front portion and a rear portion which, in a preferred embodiment, are tubular and thus are substantially circular in cross-section.

The front portion comprises a horizontal elongate member having supporting means at the forward end thereof. In the alternative, securing means can be mounted at the forward end of the front portion in lieu of the supporting means. The supporting means and the securing means can comprise one of a plurality of removable attachments or hooks, clips and the like for lifting or securing an article.

The rear end of the horizontal elongate member connects the elongate member with an upper end of a vertical member which includes manual gripping means in the form of a handgrip member to be grasped by the hand of the user. The vertical member is substantially vertical relative to the elongate member and is preferably oriented at an angle of between about 100 and 140 degrees relative to horizontal.

The rear portion of the device is connected to the front portion and includes means for engaging the forearm of the user. In particular, the engaging means comprises a forearm brace member and a forearm cradle member and is preferably offset therefrom in a vertical plane. The forearm brace member is connected to a lower end of the vertical hand gripping member. The upper end of the forearm brace member is connected to an upper end of an inner portion of the forearm cradle member. The forearm cradle member includes an inner portion and outer portion which together define the generally U-shaped cradle member for receiving the forearm of the user.

In operation, the hand of the user grasps the handgrip member and the forearm of the user is received within the forearm cradle member. The forearm brace member comfortably engages the inner or outer surface of the user's forearm depending on whether the user is right or left-handed. The supporting or securing means is provided with an appropriate attachment or implement to lift, support or otherwise secure the article.

The utility handle generally requires the muscles of the upper arm, rather than the wrist, to resist the load generated by the article to which it is attached. This increases the comfort and ease of movement for the user and provides a handle which is far easier to use than one which puts the whole load of an attached article on the wrist alone.

Moreover, the cradle member of the forearm engaging means can be oriented to contact the lower side, the upper side or both the lower and upper sides of the forearm of the user. The particular orientation of the cradle member relates directly to the direction(s) in which forces will be exerted on the forearm during use of the handle.

In another preferred embodiment, the rear portion of the device includes either an integral or a movable cross member that engages the top (or the bottom) of the forearm to provide additional support. This feature is included for those situations where an up and down motion is required to transport the article.

Any of the aforementioned types of forearm cradles can also be used in an embodiment of the handle of the present invention in which the front and rear portions are adjustably connected to one another in a telescoping relationship. Because of its ability to vary the distance between the gripping area and the forearm cradle, this adjustable model of the handle would be able to comfortably and securely accommodate forearms of different lengths.

One advantage of the present device is that relatively heavy or bulky loads can be lifted or supported with minimal strain being placed on the wrist of the user. This is because the force required to lift the article is effectively transferred from the wrist to the user's upper arm muscles.

Another advantage of the present device is that a handle of this design will reduce the amount of fatigue experienced by a worker in the performance of a given task. This should be an important consideration in the workplace because less fatigue usually results in an improvement in the overall quality of one's work, as well as a reduction in the number of task-related accidents and injuries.

BRIEF DESCRIPTION OF THE DRAWINGS

In the drawings, which comprise a portion of this disclosure.

DETAILED DESCRIPTION OF A PREFERRED EMBODIMENT

Figure 1:
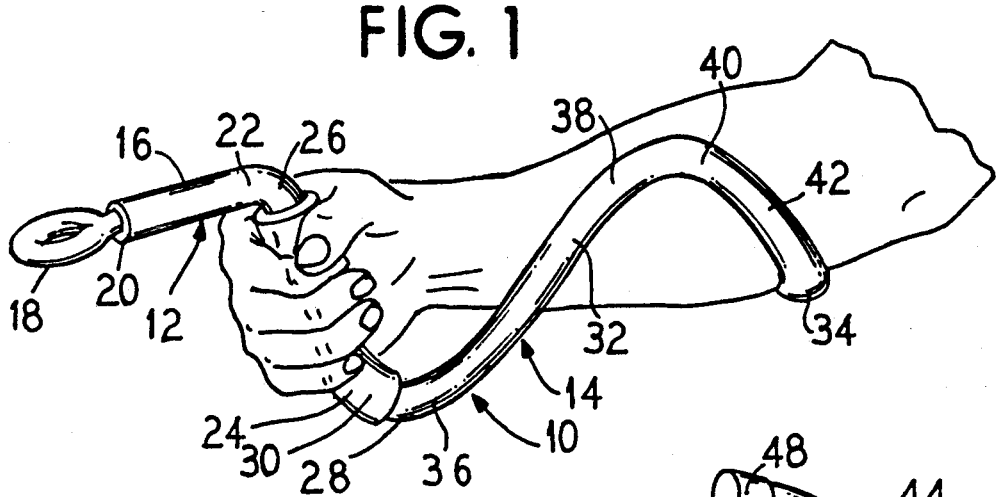
FIG. 1 is a perspective view of one embodiment a utility handle according to the present invention positioned in a hand and around an arm to demonstrate wage.
Figure 2:
FIG. 2 is a top view of the embodiment of FIG. 1.
Figure 3:
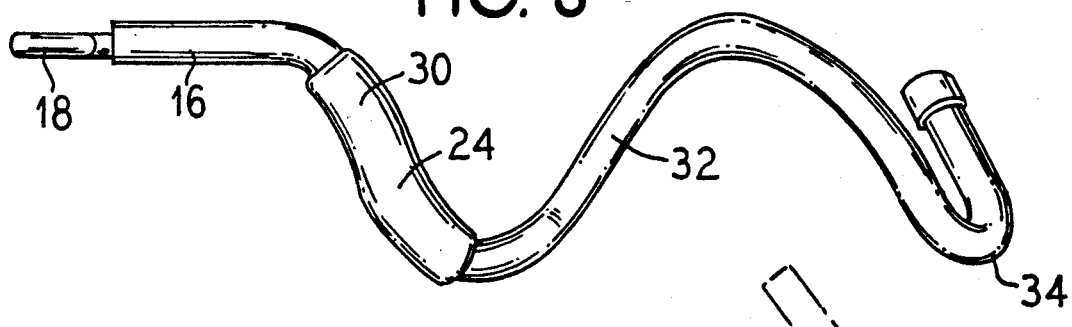
FIG. 3 is a side elevational view of the embodiment of FIGS. 1 and 2.

Referring to FIGS. 1-3, a utility handle 10 according to one embodiment of the present invention includes a front portion 12 and a rear portion 14 which are preferably formed (as on a mandrel) from a single length of tubing or pipe from an appropriate material such as aluminum or steel. Any of a number of the newer "engineering" grade plastics having sufficient strength and toughness could be substituted for metal in an injection-molded version of the handle. It should be recognized that the present device can be used to lift and support relatively heavy objects so the materials used in the manufacture of the device should be selected accordingly.

The utility handle is formed or molded into a generally S-shaped construction. The front portion 12 comprises a horizontal elongate member 16 having supporting or securing means 18, which is preferably rigid, attached to the forward end 20 thereof. The supporting or securing means can comprise any number of implements or attachments well known in the art.

The drawings include an eyehook as representative. An eyehook would be useful if the device was used as a restraining means for handling an animal. A dog leash, for example, could be fastened to the eyehook for the purpose of gaining greater control over a large or ill-mannered dog than one could achieve by simply grasping the looped end of a leash.

In another embodiment, an item such as the hoop for a fishing or landing net could be integrally or removably secured to the forward end 20 of the horizontal elongate member 16. In such an arrangement (and particularly if the handle includes a "wrap-around" cradle which contacts both the top and bottom sides of the user's forearm), the net could very easily be maneuvered back and forth through the water. While many landing nets provide an extended handle portion so that the fisherman can brace the handle portion under his upper arm when attempting to lift a heavy fish, a landing net incorporating the handle of the present invention would be at least as efficient in terms of lifting a fish out of the water while being much more compact and less cumbersome to use.

A rear end 22 of the horizontal elongate member 16 connects the elongate member 16 with a substantially vertical member 24 which includes an upper end 26 and a lower end 28. The vertical member 24 is preferably oriented at an angle of between about 100 and 140 degrees relative to the horizontal elongate member 16. A handgrip member 30, preferably made of plastic or rubber, is provided on vertical member 24 to provide gripping means for the hand of the user.

The rear portion 14 of the device includes a forearm engaging means which comprises a forearm brace member 32 and a forearm cradle member 34. The forearm brace member 32 includes a lower end 36 that is connected to the lower end 28 of the vertical member 24 of the front portion 12. The forearm brace member 32 terminates in an upper end 38 that is connected to an upper end 40 of an inner portion 42 of the forearm cradle member 34.

Figure 4:
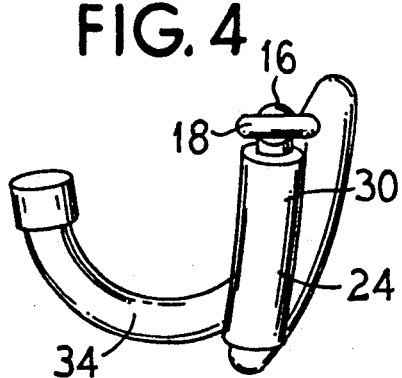
FIG. 4 is a front view of the embodiment of FIGS. 1-3.

The forearm brace member 32 is substantially parallel to the plane of the vertical member 24 but is slightly offset therefrom in a vertical plane as shown in FIGS. 2 and 4. The forearm cradle member 34 includes the inner portion 42 and an outer portion 44 which together define a generally U-shaped member for receiving the forearm of the user. The upper end 46 of the outer portion 44 can include an end cap 48 to prevent any sharp edges about the upper end 46 of the outer portion 44 from scraping the skin of the user's forearm.

Figure 5:
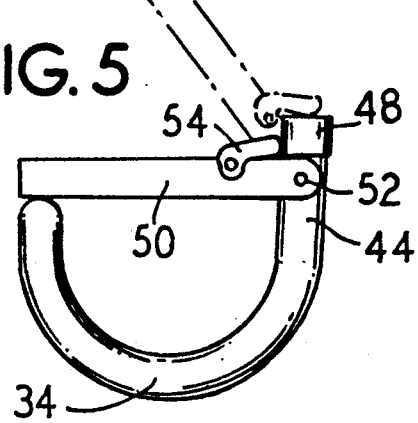
FIG. 5 is a rear view of an alternative embodiment of the rear portion of the utility handle which includes a movable restraining member for releasably securing the handle to the forearm of the user.
Figure 6:
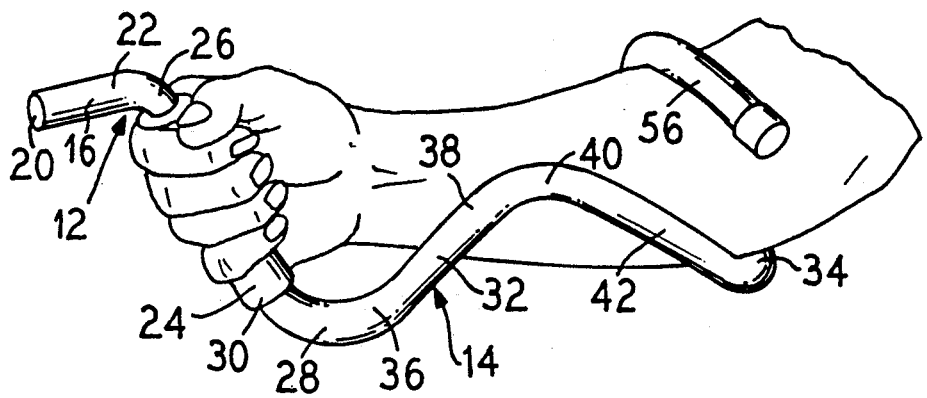
FIG. 6 is a perspective view of an additional embodiment of the utility handle which is positioned in a hand and around an arm to show a stationary restraining member securing the handle to the forearm of the user.
Figure 7:
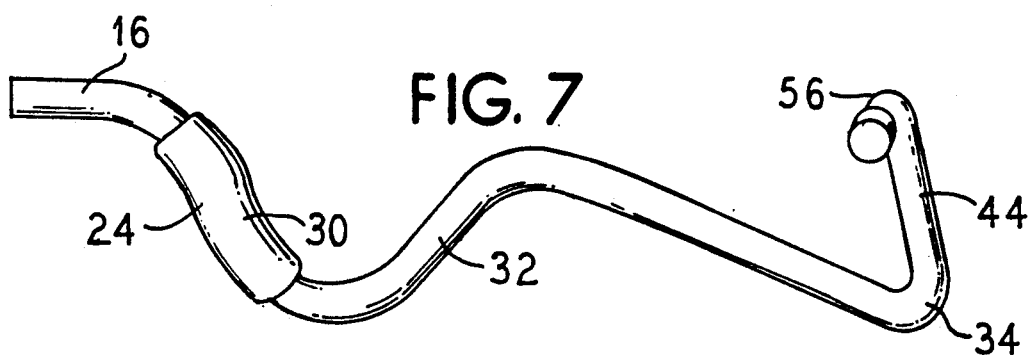
FIG. 7 is a side elevational view of the embodiment of FIG. 6.
Figure 8:
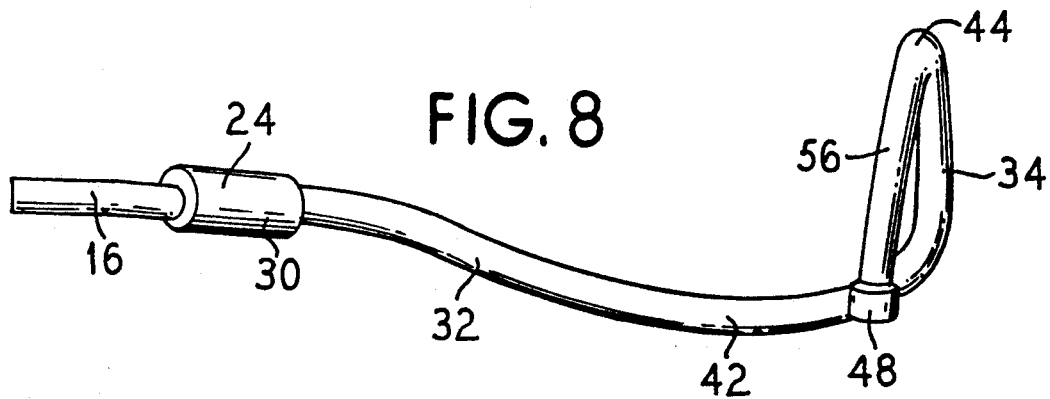
FIG. 8 is a top view of the embodiment of FIGS. 6 and 7.
Figure 9:
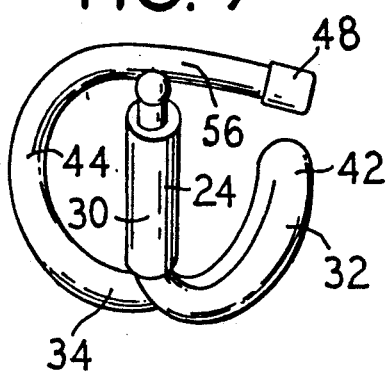
FIG. 9 is a front view of the embodiment of FIGS. 6-8.

FIG. 5 shows an alternative embodiment of the forearm cradle member 34 which includes a cross member 50 pivotally connected to the upper end 46 thereof by hinge means 52. The cross member 50 can comprise a curved or straight rigid portion, a leather strap or an elastic band which contacts the upper side of the forearm during use of the device. The hinge means 52 can comprise any conventional assembly for pivotally mounting a pair of members and is not limited to the illustrated construction.

In addition, means can be included for locking or securing the cross member 50 in a closed position during use. The locking means can comprise one or more rotatable members 54 mounted on the cross member 50 or the cradle member 34 by a pin assembly or the like.

FIGS. 6-10 relate to an additional preferred embodiment of the device which includes a second type of cross member 56 associated with the forearm cradle member 34. This cross member 56 is not pivotally mounted, but comprises an integral extension of the outer portion 44 of the cradle member 34. This construction is particularly useful when the attached article must be both lifted and lowered. To illustrate, when the article is lifted, the lower or under side of the user's forearm presses against the lower portion of the forearm cradle member 34. When the article is being lowered, however, and the resistance to be overcome is opposite that which is experienced during the lifting process, the upper side of the user's forearm will be pressed against the cross member 56.

In most other respects, however, the device shown in FIGS. 6-10 is similar o the device shown in FIGS. 1-4. In all cases, the fact that the user's forearm is rigid, and therefore cannot be bent, means that any loads normally directed to the user's wrist are transferred up the arm to the next "hinging point" (the elbow) where they are resisted by the much stronger muscles of the upper arm.

Figure 10:
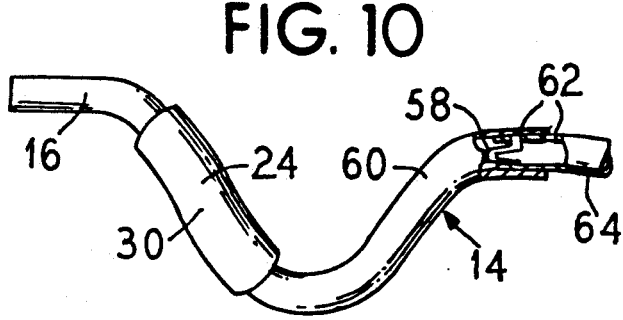
FIG. 10 is a partial side view of an alternative embodiment which allows for adjustment in the length of the handle.

FIG. 10 illustrates how the rear portion 14 can be configured to vary the overall length of the device. The rear portion 14 can comprise a two-piece member adjustably connected in a telescoping relationship. The point of connection of the two-piece member is preferably located along a relatively straight section of the rear portion as drawn. An analogous two-piece member could alternatively be included along a relatively straight section of the front portion 12; for example, along the length of the horizontal elongate member 16. Detent means at the point of connection allows the combined length of the particular intersecting portions to be adjusted as needed.

The detent means can comprise a flexible spring clip 58 mounted within one end of a first member 60 which can releasably engage one of a plurality of holes 62 in the corresponding end of a second member 64. In this embodiment, one member 60 or 64 must have an inside diameter that is slightly larger than the outside diameter of the other member to provide the telescoping relationship.

In operation, the user grasps the handgrip member 30 with his hand. The lower portion of the user's forearm is received with the forearm cradle member of the rear portion 14 of the device. With the embodiment shown in FIGS. 6-10, the hand is first inserted through the opening in the forearm cradle portion before the handgrip member 30 is grasped. The forearm can then rest within the cradle member as described herein. Use of the present invention reduces fatigue and the chances for injury to the user.

Figure 11:
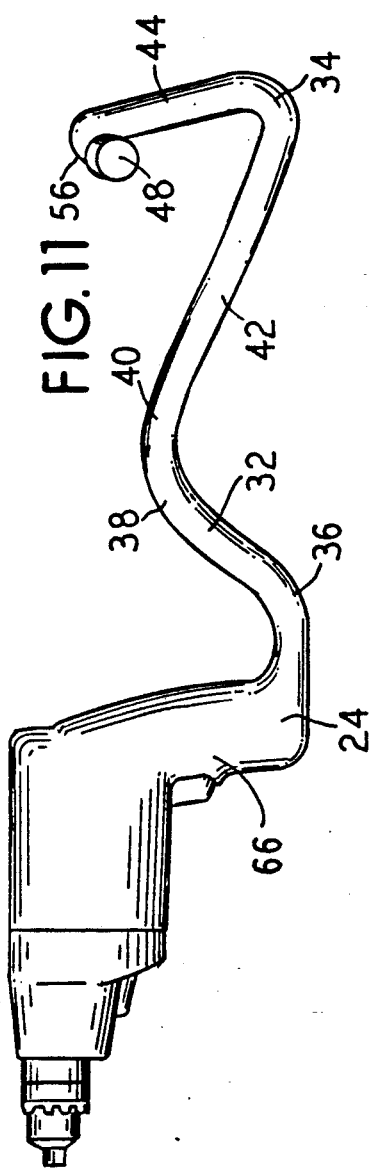
FIG. 11 is a side elevational view of an alternative embodiment in which the handle portion of a tool is combined with the utility handle to form an integral molded or cast housing.
Figure 12:
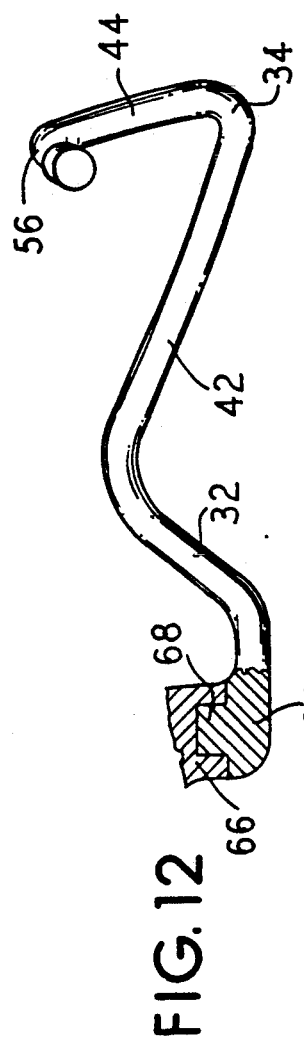
FIGS. 12 and 13 are side elevational views of alternative embodiments in which the utility handle is adapted to releasably engage the handle portion of a tool.
Figure 13:
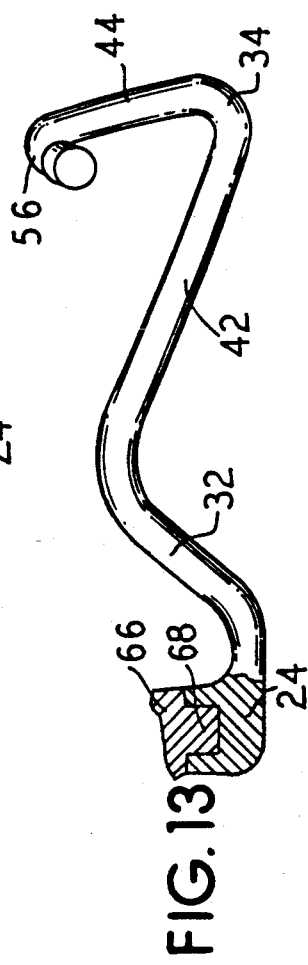

Two other alternative embodiments of the utility handle of the present invention are shown in FIGS. 11-13. FIG. 11 shows how tools such as electric drills, reciprocating saws and the like, can include a molded or cast housing which integrally connects the front portion of the present invention with a handle portion 66 of the tool to form an integrated assembly.

FIGS. 12 and 13, on the other hand, disclose an embodiment in which the present invention is configured in such a way as to be removably attached to the handle portion 66 of a tool such as an electric drill, reciprocating saw and the like. Such an aftermarket model could be manufactured to be received within (see FIG. 12) or to slip over (see FIG. 13) the bottom end 68 of the handle portion 66 of a tool in a press-fit connection.

Referring once again to the supporting and securing means which is attached to the horizontal elongate member 16, it should be understood that these can also include (but are not limited to) flexible or spring-like extensions or attachment means, various ball and socket-type swiveling hooks or clips and other attachments which operate in a swinging or vertical motion.

Referring now to the rear or cradle portion of the present invention, it should be understood that it may have any number of shapes which may include (but are not limited to) a simple spiral extending back from the bottom end of the front portion of the device, or an extruded, cast, or molded ring or oval which is variously attached to the front portion of the device.

Also, it is expected that various situations may call for an embodiment of the present invention which can be hinged so as to be able to be folded-up or collapsed into a more compact configuration for shipping or storage.

Accordingly, the utility handle of the present invention may be used to lift, lower and support a wide variety of articles and to cause a substantial portion of the load of the article to which it is attached to bear not on the user's wrist, but rather on his forearm and (by way of the elbow joint) the muscles of the upper arm.

It should be understood that various modifications, changes and variations in addition to those discussed herein may be made in the arrangement, operation and details of the construction of the elements disclosed herein without departing from the spirit and scope of the invention.

What is claimed is:

1. Handle means for cooperative engagement with a hand and associated forearm, said handle means comprising an elongated, rod-like, continuously extending member having a rear end and a front end and having a plurality of longitudinally adjacent segments located progressively along the length thereof proceeding from said rear end to said front end and comprising:

(a) a first segment having a generally transversely extending mid-region configured for cradling a portion of said forearm, said first segment terminating adjacent a lower inside portion of said forearm with said mid-region extending upwardly therefrom;

(b) a second segment being substantially arcuate throughout a substantial portion of its length said second segment extending generally longitudinally from said first segment along the inside portion of said forearm first upwardly and then downwardly to a lower location that is generally adjacent an outside lower portion of the palm of said hand when the thumb thereof is in an upright orientation;

(c) a third segment having a mid-region that transversely extends across the inside of said hand from said second segment, said third segment being graspable by said hand between said palm and the finger portions of said hand in a fisted configuration; and (d) a fourth segment having a longitudinally and forwardly projecting mid-region that extends from said third segment and that includes terminally located mean sat said front end for carrying out a predetermined work function; so that said forearm is braced along said inside potion by said second segment and leverage upon said fourth segment is cooperatively provided by said hand and said forearm through said handle means.

2. The handle means of claim 1 wherein said third segment is circumferentialy provided with a plastic handgrip member.

3. The handle means of claim 1 wherein said rear end is overfitted with an end cap.

4. The handle means of claim 1 wherein said front end includes means for associating same with a tool means.

5. The handle means of claim 1 wherein said first segment is provided with forearm retaining means.

6. The handle means of claim 1 wherein said rod-like member is comprised of metal.

7. The handle means of claim 1 wherein said rod-like member is comprised of plastic.

8. The handle means of claim 1 wherein said mid-region of said first segment is generally U-shaped along said forearm.

9. The handle means of claim 1 wherein said mid-region of said first segment is generally configured to wrap around said forearm.

10. The handle means of claim 1 wherein said rod-like member comprises at least two sections abuttingly interconnected by connecting means.

11. The handle means of claim 1 wherein said terminally located means includes means for releasable connection thereof to said front end.

* * * * *